United States Patent [19]

Cerruti et al.

[11] Patent Number: 5,156,380
[45] Date of Patent: Oct. 20, 1992

[54] DAMPING SUPPORT FOR MOUNTING AN ENGINE TO A FRAME

[75] Inventors: Mauro Cerruti; Giovanni Vanessi, both of Milan, Italy

[73] Assignee: Pirelli Sistemi Antivibranti S.p.A., Milan, Italy

[21] Appl. No.: 606,598

[22] Filed: Oct. 31, 1990

[30] Foreign Application Priority Data

Nov. 20, 1989 [IT] Italy ............................... 22448 A/89

[51] Int. Cl.$^5$ .......................... F16F 7/10; B60K 5/12; F16M 13/00
[52] U.S. Cl. .................................. 267/293; 188/378; 248/559; 267/140.3; 267/141; 267/153; 267/136
[58] Field of Search ............... 267/140.3, 140.4, 140.5, 267/141, 141.1, 152, 153, 292, 293, 294, 219, 140.1, 140.2, 136; 248/638, 562, 559; 180/312, 300, 902; 188/378-380

[56] References Cited

U.S. PATENT DOCUMENTS

| | | | |
|---|---|---|---|
| 3,128,978 | 4/1964 | Sykes . | |
| 4,403,762 | 9/1983 | Cogswell, II et al. . | |
| 4,415,148 | 11/1983 | Mair et al. | 267/140.1 |
| 4,418,898 | 12/1983 | Atsumi et al. | 267/141.1 X |
| 4,576,366 | 3/1986 | Galles et al. | 267/219 |
| 4,589,638 | 5/1986 | Hofmann et al. | 267/140.1 |
| 4,613,118 | 9/1986 | Morita | 267/140.1 |
| 4,637,584 | 1/1987 | Takehara | 248/559 |
| 4,641,809 | 2/1987 | Beer | 248/559 |
| 4,641,817 | 2/1987 | Clark et al. | 267/140.1 |
| 4,741,521 | 5/1988 | Schiffner et al. | 267/293 X |
| 4,757,982 | 7/1988 | Andrä et al. | 267/140.3 X |
| 4,807,857 | 2/1989 | Wolf et al. | 267/141.1 X |
| 4,829,953 | 5/1989 | Mertens | 267/141.1 X |
| 4,889,328 | 12/1989 | Uno et al. | 248/559 X |
| 4,944,482 | 7/1990 | Bouhier et al. | 248/559 X |

FOREIGN PATENT DOCUMENTS 0040327 11/1981 European Pat. Off. .
0189510 8/1986 European Pat. Off. .
0410941 1/1991 European Pat. Off. .
2449826 9/1980 France .
2041488 9/1980 United Kingdom .

OTHER PUBLICATIONS

"Examen synoptique sur leurs modeles communs des problemes de suspension adeux etages et d'amortissement dynamique des vibrations", Extrait du Journal S.I.A., Oct. 1958, pp. 23-37; M. A. Julien.
Copy of pages 79-105 from textbook "Mechanical Vibrations" by J. P. Van Den Hartog (McGraw-Hill 1956).

Primary Examiner—Douglas C. Butler
Attorney, Agent, or Firm—Stevens, Davis, Miller & Mosher

[57] ABSTRACT

A mounting to hang an engine to a frame, adapted to insulate the frame from predetermined high-frequency and small-amplitude vibrations. The mounting comprises an envelope, a cover in the form of an elastomeric diaphragm associated with the side walls of the envelope, a pin adapted to receive the engine weight, engagement parts connecting the envelope to the frame. The mounting is comprised of a rocking system consisting of two masses and three elastomeric bodies with rigidities K2, K3, K4. The two masses are connected to each other by one elastomeric body and are in parallel to the elastomeric diaphragm being connected to the pin and envelope by interposition of the two other elastomeric bodies. The diaphragm and the parallel system when high-frequency and small-amplitude vibrations occur, give rise to a dynamic rigidity defined by two peaks and a valley therebetween; one of the peaks has a lower height than the other. The rigidity K2, K3, K4 values of the damping coefficients and the ratio between the rigidity K3 and the overall static rigidity Kst is such that the height of the smaller peak is lower than the value of the overall static rigidity.

20 Claims, 1 Drawing Sheet

DAMPING SUPPORT FOR MOUNTING AN ENGINE TO A FRAME

BACKGROUND OF THE INVENTION

The present invention relates to an engine mounting applied to a motor-vehicle frame and in greater detail to an engine mounting adapted to damp low-frequency and large-amplitude vibrations and to insulate the frame from high-frequency and small-amplitude vibrations.

It is known that an engine mounting may be comprised of an envelope, an elastomeric diaphragm of truncated conical form, a pin, engagement parts connecting the envelope to the motor-vehicle frame.

The diaphragm is associated at its ends with the envelope side walls and in the middle with the pin designed to support the engine weight.

While the vehicle is running, when low-frequency and large-amplitude oscillations, that is between 5 and 10 Hz and 2 and 4 mm respectively, are present, due for example to bounds as a result of the road bumpiness, the elastomeric diaphragm is subject to an increasing deformation due to the dissipation of the energy absorbed in damping the oscillations.

Unfortunately, in the presence of high-frequency, between 100 and 200 Hz, and small-amplitude, between 50 and 200 micron, oscillations the elastomeric diaphragm behaves more or less like a spring the rigidity constant of which increases as the frequency increases, practically transmitting to the frame to a greater degree the oscillations received.

Therefore the known mounting does not insulate the frame from high-frequency and small-amplitude vibrations.

The preceding drawback can be solved having recourse to further known devices in which particular means is provided designed to reduce the values of the high-frequency and small-amplitude vibrations transmitted to the frame.

The known solutions are based on the principle of hydraulically damping low-frequency and large-amplitude vibrations and absorbing high-frequency and small-amplitude vibrations through the displacements of elastomeric diaphragms.

Practically these diaphragms of small thickness moved in opposite ways relative to the axis of the device by high-frequency and small-amplitude vibrations during their movement prevent high-frequency reactions from being transmitted to the frame or greatly attenuate their transmission.

By way of example we only mention here that such a device is disclosed in GB Patent 2 041 488 B.

However the previous solution involves the drawback of having recourse to particular closure means and modalities in order to ensure a perfect sealing of the liquid inside the device.

The problem that the applicant wished to solve during its research was how to accomplish an engine mounting capable of eliminating or at least substantially attenuating in a uniform manner the high-frequency and small-amplitude vibrations included between a determined range, resorting to the use of elastomeric materials and avoiding taking advantage of damping means in a liquid.

The solution to this problem must also ensure the integrity of the elastomeric materials so that the different stresses acting thereon may not give rise to breakages of any kind, for example as a result of tearings due to tractive efforts or high-frequency stresses of any other type which could tend to induce risks of fatigue relaxation in the elastomeric materials.

The present invention therefore aims at accomplishing an engine mounting which is devoid of all the previously mentioned drawbacks.

SUMMARY OF THE INVENTION

It is an object of the present invention a spring mounting to hang an engine to a frame, adapted to insulate the frame from predetermined high-frequency and small-amplitude vibrations, said mounting being comprised of an envelope, a cover for the envelope in the form of an elastomeric diaphragm, a pin, engagement parts connecting the envelope to the frame, said diaphragm being associated at its ends with the envelope side walls and the pin designed to receive the engine weight respectively, said mounting being characterized in that it comprises a rocking system consisting of two masses M1, M2 and three (second, third, fourth) elastomeric bodies having rigidities K2, K3, K4, the first mass being associated with the pin through the interposition of said second elastomeric body, the second mass being associated with the envelope through the interposition of said fourth elastomeric body, said two masses being associated with each other through the interposition of said third elastomer body, the diaphragm and said system, when high-frequency and small-amplitude vibrations occur, giving rise to a dynamic rigidity defined by two peaks and a valley therebetween, the height of one of the peaks being smaller than that of the other and said two peaks corresponding to two resonance frequencies defining a range inside which the high frequencies of said predetermined vibrations to be insulated relative to the frame are included, the values of rigidities K2, K3, K4 and damping coefficients and the ratio between the rigidity K3 and the static rigidity Kst being such that the height of the smaller peak is lower than the static rigidity value. The present invention will be best understood from the following detailed description carried out by way of non-limiting example with reference to the accompanying drawing sheets, in which:

DETAILED DESCRIPTION OF THE INVENTION

Figure 1:
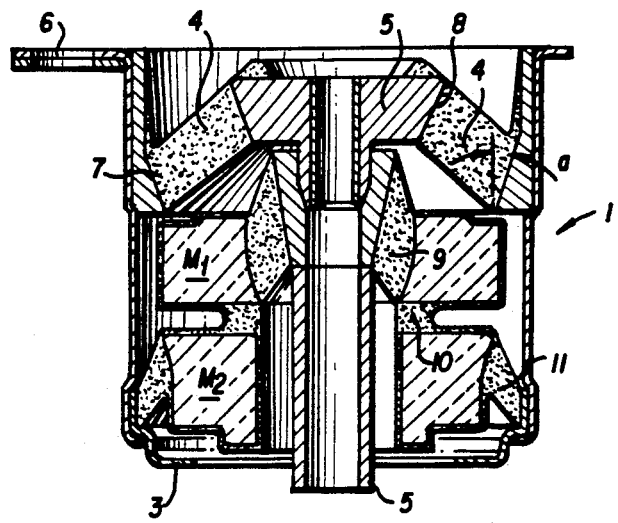
FIG. 1 shows a longitudinal section of an engine mounting in accordance with the invention.

In FIG. 1, a mounting to hang an engine 2 to a motor-vehicle frame is identified by reference numeral 1.

In one possible application the mounting supports an engine having a weight of 80 kg.

Mounting 1 comprises a rigid envelope 3, a cover 4 for the envelope embodied by an elastomeric diaphragm of truncated conical form, a pin 5, engagement parts connecting the envelope to the frame, partially shown in the figure by holes 6 adapted to receive appropriate locking bolts to fasten the mounting to the frame.

The diaphragm is associated at its ends 7, 8 with the envelope side walls and the pin 5 respectively.

Mounting 1 also comprises a rocking system consisting of two, first and second respectively, masses M1, M2 and three elastomeric bodies 9, 10, 11, identified as second, third and fourth body respectively.

The ratio between the first and second mass is included between 0.2 and 1.1.

Preferably the two masses consist of two rings, in particular two cylindrical identically-shaped elements, lying in two parallel planes in concentric relation with the pin.

Each of the two masses can be made of a variety of rigid materials, selected among others from lead, preferably with an overall weight lower than or equal to 2 kg.

The second and fourth elastomeric bodies have rigidities K2, K4 and the ratio between the rigidities of the second and the fourth bodies ranges between 1.2 and 0.6.

In the example herein described rigidities K2 and K4 are identical.

In addition the rigidities of the second and fourth elastomeric bodies are lower than rigidity K3 of the third elastomeric body. Preferably the ratio between K3 and K2 or K3 and K4 is in the range of 2 to 4.

The diaphragm and the three elastomeric bodies can be made of the same material, natural rubber in the example, of hardness between 35 and 55 IRH.

Obviously sizes being the same, greater hardnesses such as between 45 and 55 IRH for example, will usually correspond to a greater rigidity and smaller hardnesses such as between 35 and 45 IRH for example, will correspond to a lower rigidity of the elastomeric bodies to the ends of the invention.

In addition a fundamental feature of the invention consists in that in the elastomeric bodies the damping coefficient has a value which, in order to achieve the desired results, is preferably selected in the range of 0.02 and 0.05 daN s/mm. The damping coefficient is determined by an instrument known to practitioners as a vibrograph.

In particular the second and fourth elastomeric bodies are of truncated conical form and the third elastomeric body is of cylindrical form, said form contributing to the rigidity of the same.

As shown in FIG. 1, the second elastomeric body 9 connects the first mass M1 to the pin 5 and the fourth elastomeric body 11 connects the second mass M2 to the envelope 3 side walls; the side walls of the masses, that is the outer one in the first mass and the inner one in the second mass respectively, are spaced apart from the pin and the envelope walls to such an amount that they behave like floating masses.

The opposite bases of the two masses M1 and M2 are connected to each other by the third elastomeric body 10 so as to complete the formation of a branch, comprised of two masses tied by three rigidities, disposed in parallel to another branch including the diaphragm 4 the ends of which are between the pin and the envelope.

In the described application the attachments between the elastomeric materials and rigid parts are of the type normally used between rubber and metal.

Preferably the rigidities of the first and second branches are so selected that the static load is divided into equal parts.

According to a preferred embodiment, for the purpose of reducing the response reactions to vibrations between 120 and 200 Hz, it has been deemed convenient to resort to the following ratios between the different rigidities and the overall static rigidity Kst:
(a) K1/Kst=0.45–0.55;
(b) K2/Kst=0.9–1.5;
(c) K2=K4;
(d) K3/Kst=2–5.

It is wished to point out here that the overall static rigidity is the ratio between the load applied to pin 5 under rest conditions and the downward displacement undergone by the pin by effect of the elastic deformations of the elastomeric parts of the mounting.

The static rigidity of the two parallel branches of mounting 1 is given by the following expression:

$$Kst = K1 + \cfrac{1}{\cfrac{1}{K_2} + \cfrac{1}{K_3} + \cfrac{1}{K_4}}$$

In a possible embodiment, mounting 1 is characterized by the following rigidity values:
(e) K2=K4;
(f) K3=3K2;
(g) Kst=K1+3/7×K2.

Still in a preferred embodiment of the invention the different rigidities and the masses have the following numerical values:
(h) K1=6 daN/mm, where N=Newton;
(i) K2=14 daN/mm;
(l) K3=53 daN/mm;
(m) K4=14 daN/mm;
M1=M2.

The two masses have a weight density in the range of 11 to 12 kg/dm$^3$ and they are made for example of lead, the corresponding weight of each mass being 0.97 kg.

Figure 2:
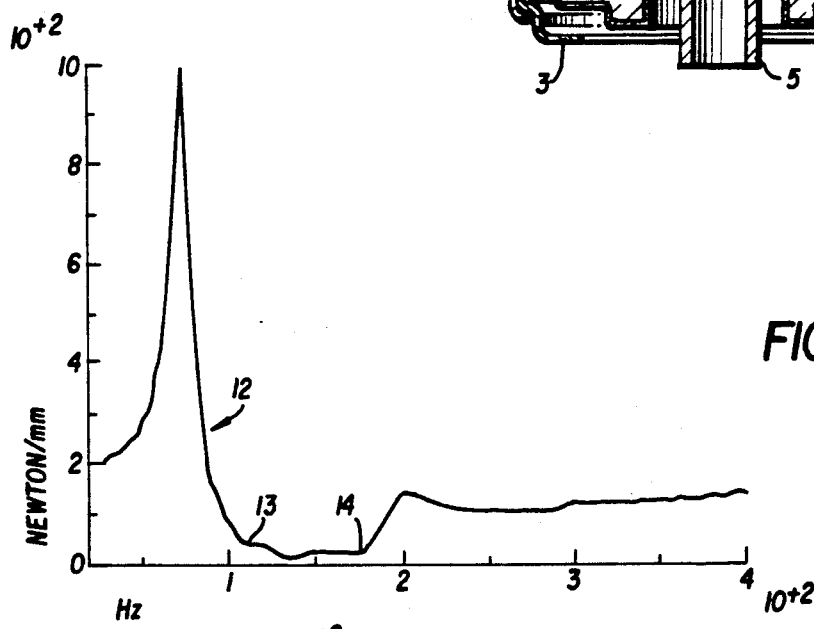
FIGS. 2 and 3 qualitatively show the diagrams of the dynamic rigidities depending upon the oscillation frequencies for the mounting shown in FIG. 1 and a known mounting respectively.

The parts relating to the example shown in FIG. 2 are characterized by the following values:

The diaphragm has a distance of 15 mm between the opposite surfaces, an angle "a" of 20 (degrees), and the length of the surfaces disposed at one side of the pin is 25 mm. The pin has a connecting surface to the diaphragm of truncated conical form the diameter of which is 28.5 mm in the upper part and 19 mm in the lower part.

The second elastomeric body 9 is internally associated with the pin 5 and externally with diametrically opposite points of the mass M1; the diameter of said points is respectively 41 mm in the upper position and 34 mm in the lower position. The height of the second body along its axis is 36 mm.

In the third elastomeric body the height is 7 mm and the outer diameter 50 mm.

The fourth elastomeric body is engaged to the opposite side walls of the envelope spaced apart 90 mm from each other and it is internally fastened to the mass M2 along opposite points characterized by diameters in the range of 74 to 80 mm.

The thickness of the fourth body measured parallel to the axis is 9 mm.

The conical surfaces are inclined to the axes as shown in the figure.

Operation of the mounting is as follows:

When large-amplitude, between 2 and 4 mm, and low-frequency, between 5 and 10 Hz, vibrations are present, the diaphragm and the three elastomeric bodies are subjected to an increasing deformation while absorbing part of the vibration depending upon the energy dissipation caused by the damping features of the materials used.

When small-amplitude, between 50 and 10 micron, and high-frequency, between 100 and 200 Hz, vibrations are present, the response of the mounting to said vibrations is determined by the sum of reactions resulting from the deformation of the diaphragm and the parallel branch consisting of masses M1, M2 and the three elastomeric bodies.

The branch in parallel to the diaphragm behaves according to the principle of vibrations relating to two masses hanging between two springs and connected to each other by a spring. The above principle is described for example in the book "Mechanical Vibrations" by J. P. Den Hartog, fourth edition, 1956.

According to this principle, in the presence of two resonance frequencies, depending somewhat proportionally on the rigidities and in an inversely proportional manner on the masses, it happens that the system reacts with two peaks of maximum values defining a valley; in said text the valley has always a limited width as it is practically restricted at the crossing of the adjacent sides of the two peaks and therefore it is useless to the ends of the present invention.

Shown in the diagram of FIG. 2 is the sum of the reactions of the two parallel branches depending upon frequencies, while the mounting of the present invention is in operation, said diagram being obtained according to modalities to be explained in the following.

For the purpose of achieving a good operation of the mounting so as to reduce high-frequency vibrations within the concerned range between 120 and 200 Hz, it has been found convenient to adopt two resonance frequencies the first of which has a value lower than 90 Hz and at all events between 60 and 90 Hz, and the second has a value higher than 200 Hz and at all events between 200 and 260 Hz. The mounting previously described in the example has been submitted to high-frequency oscillations and compared with a traditional device provided with a diaphragm without the branch in parallel with the two oscillating masses.

The device used in the test is an instrument known to practitioners as a vibrograph.

Practically a weight corresponding to the engine weight is applied to the mounting pin 5 (in this case a weight of 80 kg) and the lowering of the pin is then determined by a graduated scale and, as a result, the value of the static rigidity can be drawn.

Subsequently the mounting is oscillated at high frequency and through an appropriate dinamometric cell of the vibrograph, the reaction force of the mounting divided by the oscillation amplitude is drawn for each frequency, thus achieving the dynamic rigidity values of the mounting, that is the mounting response to the imparted vibrations.

Figure 3:
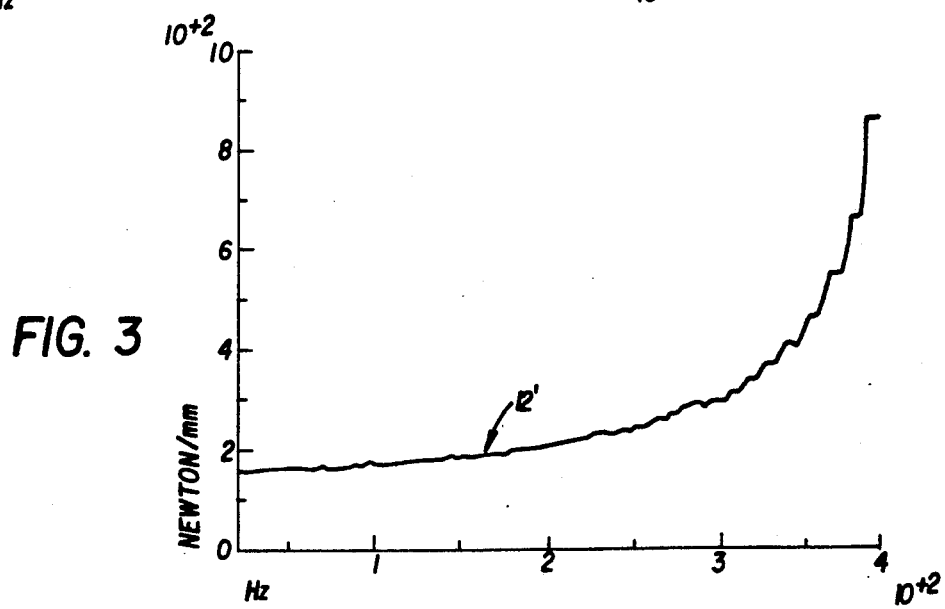

Shown in diagrams 12, 12' in FIGS. 2 and 3 are the dynamic rigidities of the mounting in accordance with the invention and of a known mounting, depending upon frequencies.

From the diagram in FIG. 2 it clearly and immediately appears that the mounting of the invention in a range between 100 and 200 Hz, which is the range of interest in the motor-vehicle field, involves an important reduction in the dynamic rigidity so as to reach valley values between points 13 and 14 remarkably lower than 50% of the static rigidity Kst value and at all events values close to zero.

From the diagram in FIG. 3 it follows as much clearly that the traditional mounting involves an increase in the dynamic rigidity as the frequency increases, and that in particular it takes dynamic rigidity values always above the static rigidity. Therefore the mounting in accordance with the invention overcomes the drawbacks of the known art and attains the intended purposes.

The optimum results shown in the diagram of FIG. 2 cannot be explained with certainty as they are achieved in contrast with a technical prejudice according to which the use of elastomeric materials in a mounting as the one described had to be discouraged.

It is in fact known to those skilled in the art that elastomeric material very well resists compression but can be torn when subjected to tractive stresses and in particular when said stresses are the result of high-frequency vibrations.

Therefore the use of elastomeric materials as connecting elements between two masses, one mass and the pin, and the other mass and the envelope respectively has never been put into pratice very probably due to a fear of a possible relaxation of said materials as a result of the unavoidable tractive stresses originated thereon by the two masses vibrating at high frequencies or at all events due to the fear of an inappropriate resistance of elastomeric materials when fatigue-stressed.

The applicant, in an attempt to clarify the results achieved by the present solution gives the following explanation.

From the book "Mechanical Vibration" a technician receives the information that in a system subjected to oscillations he can use two masses connected by springs in order to obtain that the response to the vibrations of given frequencies should be defined by two peaks and a valley between the peaks.

In said book the height of one of the peaks is smaller than that of the other and the height of the smaller peak is higher than the starting value of the response diagram to the imparted vibrations.

In addition the valley is substantially limited to one or a few frequency values.

Practically, importance is given to a valley value between two peaks which are both at higher heights than the starting value.

The applicant has guessed that, through the use of elastomeric materials and by known processes based on particular mixture formulas and on the molding and curing of given shapes, it was possible to select the characteristics of rigidity, damping and K3/Kst ratio for the purpose of piloting the smaller peak (the resonance peak having a higher frequency in the example shown in FIG. 2) towards lower values than the starting value, that is to the value of static rigidity.

The selection of the quantities shown in the examples and in the diagram of FIG. 2 proves the validity of all statements which are the bases of the invention.

It has also been ascertained that by piloting the lowering of the second peak to lower values than the static rigidity, all the valley is dragged along with said peak and said valley appears flat-shaped as desired.

Practically the valley flattens as far as it takes values very close to zero over a length practically extended to the whole high frequency range in which it is wished to reduce the system response, as clearly shown between points 13, 14 in FIG. 2.

In addition, due very probably to the damping capability of the elastomeric materials, it has been possible to achieve energy dissipations capable of making the second peak substantially flat-shaped as well, so as to affect as desired (that is as low as possible) the dynamic rigidity values at higher frequencies than the (second) resonance frequency.

In fact, to the right of the second peak (the one at higher frequency) the system response keeps below the static rigidity value and it practically appears to be the one determined by the sole rigidity K1.

Therefore, as the system response has been lowered to negligible values both in the concerned range and for higher frequencies, it has also been ensured that the involved stresses caused by high-frequency oscillations are minima, which brings about the elimination of the feared risk of deterioration of the elastomeric materials due to fatigue relaxation.

Advantageously, it is also possible to use the mounting in the presence of oscillations having higher frequencies than the resonance frequency of the second peak. In particular, the mounting of the invention can be advantageously used with motor-vehicle frames in which a structure lightening has been decided.

In fact in these solutions the inventive mounting reduces the greater noise originating from a lighter frame than the traditional ones.

While some particular embodiments have been shown and described, all possible variations accessible to a person skilled in the art are deemed to be included within the scope of the present invention; for example the upper mass M1 could be connected to the envelope walls through the second body and the lower mass M2 could be connected to the pin through the fourth elastomeric body.

The pin could have a downwardly projecting extension to which the engine is applied.

In other solutions the second branch in parallel to the diaphragm could be accommodated at the outside of the envelope.

What is claimed is:

1. A spring mounting to hang an engine to a frame, for insulating the frame from predetermined high-frequency and predetermined small-amplitude vibrations, said mounting comprising an envelope having side walls, a cover for the envelope shaped as an elastomeric diaphragm,
   a pin in said envelope,
   engagement parts connecting the envelope to the frame,
   said diaphragm having ends associated with the envelope side walls and the pin, said diaphragm and pin being positioned to receive a weight of said engine, said mounting comprising a rocking system having first and second masses M1, M2 and bodies including second, third and fourth elastomeric bodies having rigidities K2, K3, K4,
   the first mass M1 being associated with the pin through an interposition of said second elastomeric body,
   the second mass M2 being associated with the envelope through an interposition of said fourth elastomeric body,
   said first and second masses being associated with each other through an interposition of said third elastomeric body,
   the diaphragm and said rocking system, when high-frequency and small-amplitude vibrations occur, giving rise to a dynamic rigidity defined by two peaks, one of said peaks being greater and the other of said peaks being smaller and a valley therebetween, a height of the smaller peak being smaller than that of the greater peak and said two peaks corresponding to two resonance frequencies defining a range inside which the high frequencies of said predetermined vibrations to be insulated relative to the frame are included, the values of the rigidities K2, K3, K4 and of damping coefficients and a ratio between the rigidity K3 and a static rigidity value Kst being such that the height of the smaller peak is lower than the static rigidity value Kst.

2. A mounting according to claim 1, in which the ratio between the rigidity K3 of the third elastomeric body and the static rigidity Kst is in the range of 2 to 5.

3. A mounting according to claim 1, in which the ratio between the rigidity of the third elastomeric body and the rigidity of the second elastomeric body is in the range of 2 to 4.

4. A mounting according to claim 1, in which the ratio between a rigidity of the diaphragm and the static rigidity is in the range of 0.45 to 0.55.

5. A mounting according to claim 1, in which the ratio between the first and second masses is in the range of 0.2 to 1.1.

6. A mounting according to claim 1, in which the ratio between the rigidity of the second and fourth bodies is in the range of 1.2 to 0.6.

7. A mounting according to claim 1, in which the first and second masses are shaped as rings.

8. A mounting according to claim 1, in which the first and second masses consist of two cylindrical identically-shaped elements, lying in two parallel planes in concentric relation with the pin.

9. A mounting according to claim 1, in which the first and second masses are made of lead.

10. A mounting according to claim 1, in which the weight of the two masses is 2 kg at the most.

11. A mounting according to claim 1, in which the second and fourth elastomeric bodies are of truncated conical form converging towards the pin.

12. A mounting according to claim 1, in which the third elastomeric body is linked to opposite bases of said first and second masses which are each of annular shape.

13. A mounting according to claim 1, in which said diaphragm and elastomeric bodies are made of the same material.

14. A mounting according to claim 1, in which the diaphragm and the three elastomeric bodies have hardnesses between 35 and 55 IRM.

15. A mounting according to claim 1, in which the ratio between the greater peak and the static rigidity is within a range of values between 4 and 10 when the ratio between the smaller peak and the static rigidity is lower than 1.

16. A mounting according to claim 1, in which a dynamic rigidity for higher frequencies than the one corresponding to the smaller peak is lower than the static rigidity value.

17. A mounting according to claim 1, in which said envelope, through said engagement parts, is applied to said frame of a motor-vehicle subject to high-frequencies, between 120 and 200 Hz, and small-amplitude, between 50 and 200 micron, vibrations, and said first and second masses originating a dynamic rigidity comprised of two peaks in which the smaller peak is defined by a resonance frequency lower than 90 Hz and the greater peak by a resonance frequency greater than 200 Hz.

18. A mounting according to claim 17, in which a first resonance frequency for the smaller peak is included between 60 and 90 Hz and a second resonance frequency for the larger peak is included between 200 and 260 Hz.

19. A mounting according to claim 1, in which said pin is provided with an extension passing through a base of the envelope, said extension being designed to support the weight of said engine.

20. A mounting according to claim 1, in which said elastomeric bodies have damping coefficients in the range of 0.02 to 0.05 daN s/mm.

* * * * *